Patented Dec. 16, 1924.

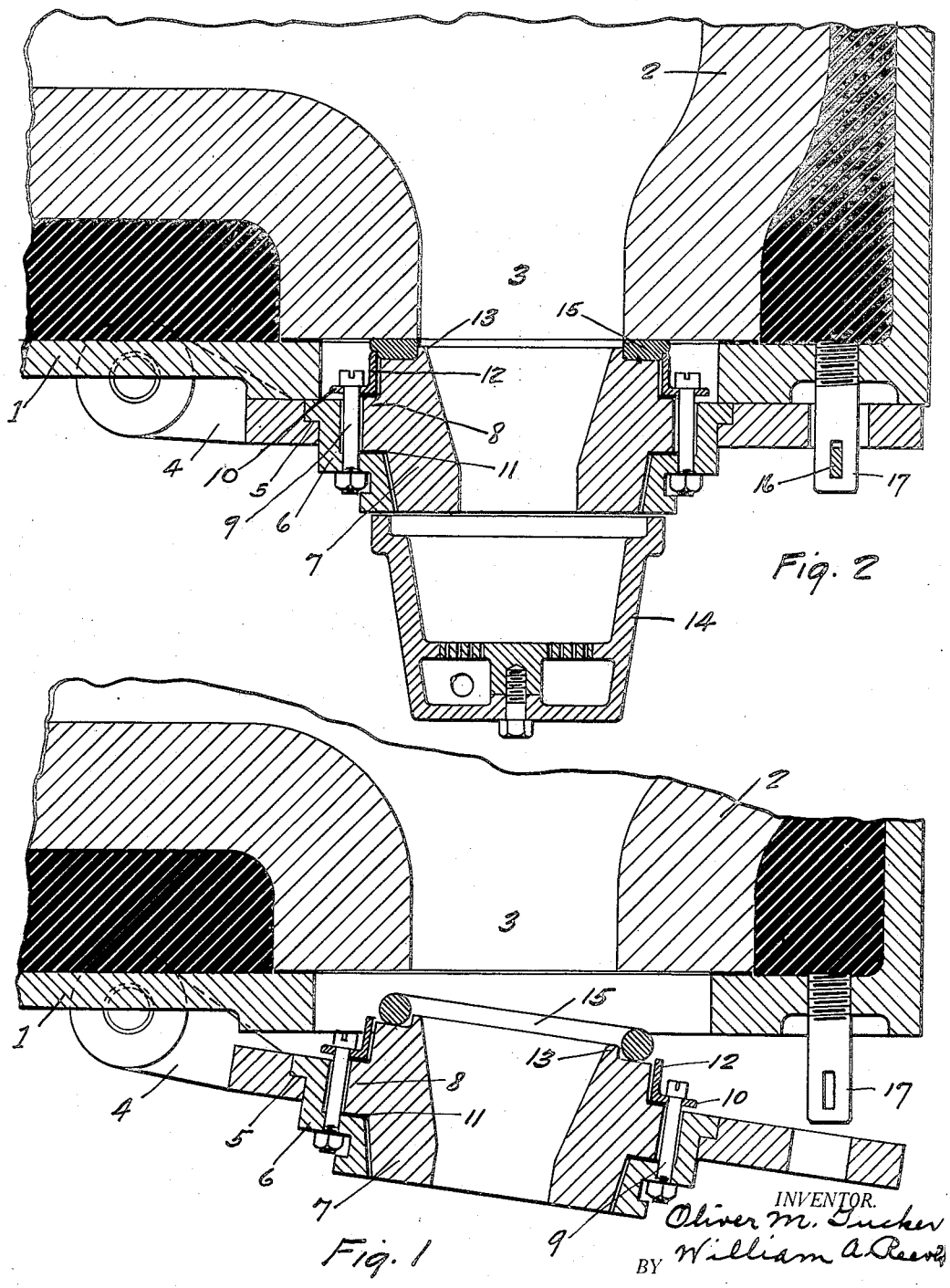

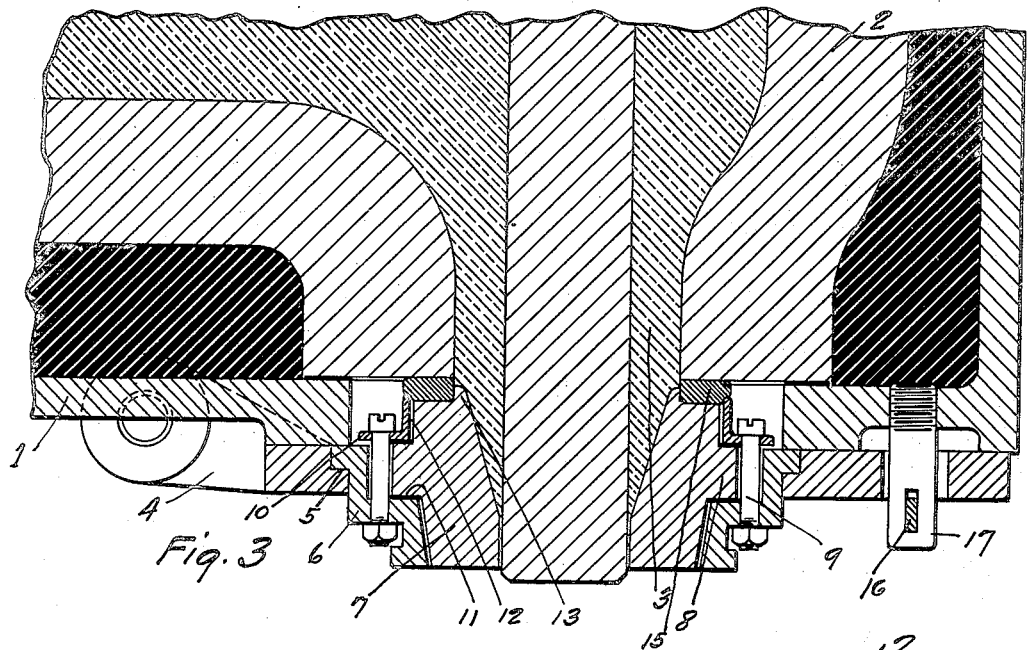
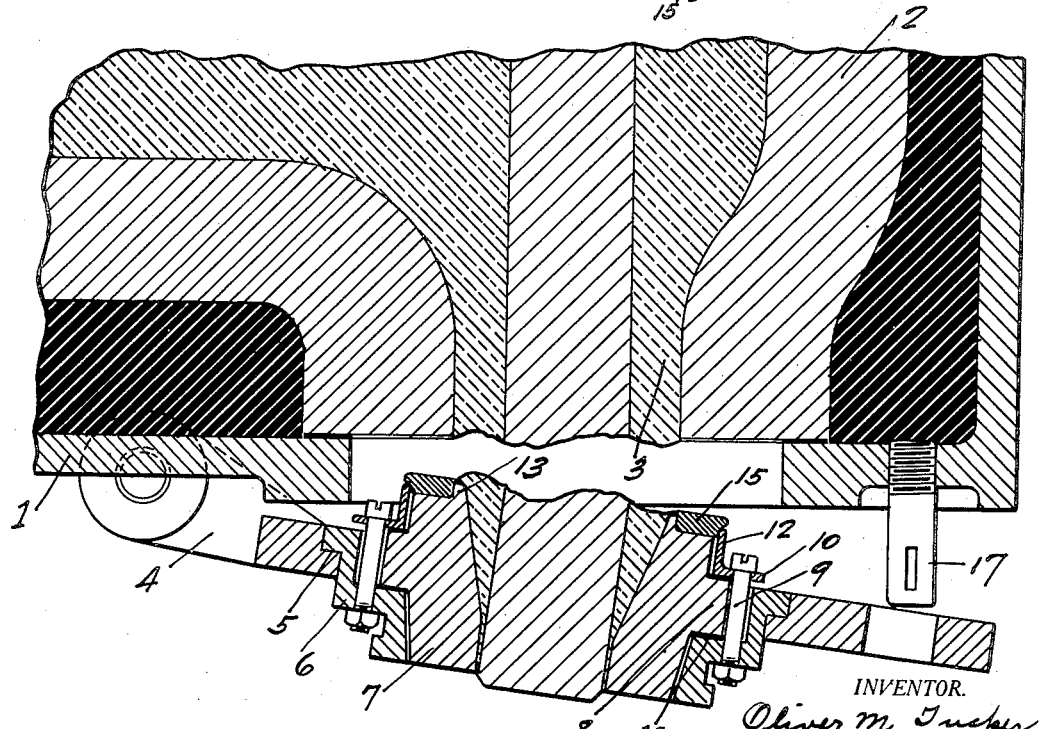

1,519,885

UNITED STATES PATENT OFFICE.

OLIVER M. TUCKER AND WILLIAM A. REEVES, OF COLUMBUS, OHIO.

INTERCHANGEABLE SPOUT-APERTURE BUSHING AND METHOD OF APPLYING THE SAME.

Application filed September 23, 1918. Serial No. 255,349.

*To all whom it may concern:*

Be it known that we, OLIVER M. TUCKER and WILLIAM A. REEVES, citizens of the United States of America, residing at Columbus, in the county of Franklin and State of Ohio, have invented certain new and useful Improvements in Interchangeable Spout-Aperture Bushings and Methods of Applying the Same, of which the following is a specification.

Our invention relates to interchangeable spout aperture bushings and a method of applying the same. It aims to provide a novel form of bushing which constitutes a delivery orifice for spouts and which is readily applicable to a permanent spout aperture by such a method that a gas-tight and glass-tight joint will result. Then, it aims to provide a method of application which will ensure this tight joint and yet permit of the ready separation necessary for the frequent replacements demanded. The bushing itself has certain novel characteristics but of equal importance is the method of application.

Our invention is peculiarly adapted to use in apparatus for producing preformed charges of viscous glass, that is, charges whose cross-sections are to be fixed by extrusion through the bushings in question. With this in view and with an understanding of the difficulties attendant upon the flowing of glass at a high temperature, it will be understood that bushings must be frequently changed.

All the workers in the art appreciate the difficulties which arise from the almost irresistible tendency of hot viscous glass to seep into any joint or crack with which it comes into contact. When this occurs, the abutting surfaces are so cemented that, if they are clay, one or the other will break in separating. Then, when it is understood that we intermittently support the glass between successive extrusions by an enclosed gas burning under pressure it will appear that we are also faced with the necessity of having a gas-tight as well as a glass-tight joint which joint, however, must be readily breakable without destruction of abutting surfaces.

The preferred embodiment of our invention is shown in the accompanying drawings wherein similar characters of reference designate corresponding parts and wherein:

Figure 1 is a transverse longitudinal section of our improved bushing, with its novel sealing means, ready to be moved into operative position.

Figure 2 is a section similar to section shown in Figure 1, showing the bushing in operative position.

Figure 3 is a vertical longitudinal section showing our method of stopping the delivery of glass from the orifice 2.

Figure 4 is a section similar to section 3 showing the bushing broken away from the spout block preparatory to complete removal from its supporting structure.

In the drawings, the spout is shown at 1 as having a spout block 2 with a delivery orifice 3 therein. Mounted on spout 1 is a hinged member 4 having a shouldered aperture as at 5, within which aperture is a bushing container 6. The hinged member may swing into or out of operative position in the manner shown in the drawings.

The bushing container 6 is socketed in its upper face to receive a clay bushing 7, which bushing is provided with a shoulder 8 clamped to the socket member 6 by means of bolts 9 and ring 10 and having a gas-tight asbestos packing at 11. The clay bushing 7 is provided with a hole of a form to impart any chosen cross-section to viscous glass extruded therethrough and, since this proper cross-section must always be attainable, or for other reasons the bushing must be changed from time to time, it is necessary that the bushing be readily removable. It will be understood that the ring 10 is flexible to accommodate itself to inequalities and it will be noted that it has an upwardly extending flange 12 cooperating with a ridge 13 on the bushing top to produce a channel effect.

The preformed glass charges are produced by intermittent extrusion through the bushing, extrusion being prevented intermittently by the capping of the delivery orifice with a cup 14 to which gas is fed and burned under pressure.

Experience has demonstrated that at the joint between the clay bushing 7 and the spout block 2 the glass has an almost irresistible tendency to seep in and cement the abutting surfaces of these elements together. Then when an attempt is made to separate the bushing 7 from the spout block 2, these elements adhere so tightly that they cannot separate without breaking one or the other. Or the gases may escape, which is undesirable. Likewise the gas of the cup may force the glass upwardly so as to bare the joint to such gases.

We have solved this difficulty, however, by the use of a ring of soft clay 15 which is first placed upon the upper irregular surface of the bushing 7 and which thereafter is compressed between the spout block and the bushing 7 when such bushing is moved into its proper position, as in Figure 2.

The clay used for this ring 15, is not only soft but it is of such a size and nature that, under the temperature that strikes it, it will not burn to anything like the degree of hardness attained by the elements which it separates and joins.

The device is simple but of utmost importance. The clay ring effectually seals the joint in question against either gas or viscous glass and yet the bushing can be readily removed by merely swinging the member 4 downward. Ordinarily, the clay ring breaks away from the spout block 2, adhering to the upper face of the bushing 7. This is probably due to the increased surface area with which it contacts on such bushing. The soft clay may be so compressed that a portion will extend through into the downward path of the glass, but, this can be remedied by merely cutting off superfluous clay. The device is simple but obviously efficient.

In operation, when it is desired to change a bushing, we preferably force a sand core upwardly into the delivery orifice, as shown in Figure 3. Then after the glass has cooled adjacent the bushing we release the hinge member and swing it down, breaking-off the sand core and the surrounding glass in the process. Then, we remove the member 6 and substitute a new bushing for the one contained therein. When we have placed the member 6 carrying the new bushing in the hinged member, we superimpose thereon a soft clay ring as shown in Figure 1. Then, the hinged member is swung upwardly until the clay ring is tightly compressed as shown in Figure 2. The hinged member is fastened in position by a wedge 16 extending through a bolt 17. If necessary, the interior upper edge of the bushing may be scraped to remove excess clay.

It is important to note that we have devised a method whereby a bushing may be changed in an extremely short period of time. With our device, a sand core may be inserted into the bushing and into the glass thereabove and then the bushing may be pulled away as soon as the glass within the bushing and adjacent thereto has slightly hardened. When this happens, the sand core will simply be broken off together with the glass within the bushing. It is also important to note that it is not necessary and in the large majority of cases not desirable to permit the main body of glass in the spout to chill. The chilling and hardening of the glass need only occur for a very slight distance above the joint between the bushing and the spout block. All practical glass workers will appreciate the importance of this great saving of time.

In the claims, the terms "deformable" and "plastic" are employed as inclusive terms for those substances which are of such a nature when applied that they will form an intimate contact with the surfaces of the spout and bushing and, probably because they fill the pores and closely fit the inequalities thereof, prevent the molten glass from seeping in between the spout and the clay ring or the clay ring and the bushing. The term "relatively inert to molten glass" is used to distinguish from those substances, such as asbestos, which will become permeated by the molten glass and be thereby converted into a substance which will bind the bushing to the spout and prevent ready separation. It will be understood that by "relatively inert" material, we refer to those substances which are substantially inert to molten glass, but not necessarily totally so.

The exact qualities and characteristics which bring about the desired results and insure ready separability are sufficiently obscure to render difficult the selection of a proper generic term, but applicants know that the commonly termed pot clay is one of the substances which produce the result and the claims of this case should be so interpreted as to give them the benefit of all equivalents, commensurate with the fact that applicants are the first in the art to produce ready separability.

Having thus described our invention, what we claim is:

1. In a device for the delivery of molten glass the combination with an apertured spout, a bushing for application to said aperture, and plastically applied means separating said bushing from the spout, said means being relatively inert to molten glass so as to maintain a gas-tight and glass-tight joint and yet permit ready detachment of the bushing without injuring either it or the spout.

2. In the art of delivering molten charges of glass the method of applying a bushing to the outlet of a spout which comprises placing a plastic ring of substantial size upon the upper surface of the bushing and then pressing the ring-crowned bushing up against the spout and holding it there, said ring being of a material that is relatively inert to molten glass and that will exclude the glass from seeping in between the spout and the bushing.

3. In a device for delivery of molten glass the combination with an apertured spout, a bushing for the spout, an intermediate layer between the spout and bushing of a readily deformable material that is relatively inert to molten glass to produce readily breakable glass-tight joints between itself and the spout and said bushing.

4. In an apparatus for delivering molten glass the combination of a spout aperture structure comprising a support, a bushing in said support, and a gas-tight joint between said bushing and its spout block formed by a material relatively inert to molten glass.

5. In a device for delivering molten glass the combination with an apertured spout, of a bushing for said aperture, a sealing ring of a readily deformable material relatively inert to molten glass between said aperture and said bushing, and a bushing support mounted to move said bushing into registry with said aperture and maintain said bushing in registry with said aperture.

6. In the art of delivering molten glass, the method of applying a removable delivery orifice device to a glass delivering spout, which comprises applying an orifice device embodying a contacting surface of material readily deformable and relatively inert to molten glass so that it will make a contact with the spout of sufficient intimacy to prevent the hot glass from seeping in between such contacting surface and the spout and will be readily separable therefrom after subjection to the hot glass.

7. In the art of delivering molten glass, the method of applying a removable delivery orifice bushing to a spout, which comprises interposing a ring of plastic material between the bushing and the spout, said plastic material being relatively inert to molten glass and of such a nature that it will make contact with the spout of sufficient intimacy to prevent the hot glass seeping in between such contacting surface and the spout and will be readily separable therefrom after subjection to the hot glass.

8. In a device for the delivering of molten glass, the combination with an apertured spout, a bushing for the spout, and an intermediate layer between the spout and bushing of a material which is soft and plastic when applied and which is relatively inert to molten glass and which when subjected to the heat of the glass never becomes as hard as the spout or bushing whereby the bushing is readily removable.

In testimony whereof we hereby affix our signatures.

OLIVER M. TUCKER.
WILLIAM A. REEVES.